Jan. 13, 1970     O. P. BARNES, JR     3,488,798
PATTY FORMING APPARATUS

Filed Dec. 15, 1966     3 Sheets-Sheet 1

INVENTOR
OWEN P. BARNES, JR.

ATTORNEYS

Jan. 13, 1970   O. P. BARNES, JR   3,488,798
PATTY FORMING APPARATUS
Filed Dec. 15, 1966   3 Sheets-Sheet 2

Jan. 13, 1970   O. P. BARNES, JR   3,488,798
PATTY FORMING APPARATUS
Filed Dec. 15, 1966   3 Sheets-Sheet 3

United States Patent Office 3,488,798
Patented Jan. 13, 1970

3,488,798
PATTY FORMING APPARATUS
Owen P. Barnes, Jr., P.O. Box 159,
Warner Robins, Ga. 31093
Filed Dec. 15, 1966, Ser. No. 601,905
Int. Cl. A22c 7/00
U.S. Cl. 17—32                                   3 Claims

ABSTRACT OF THE DISCLOSURE

This invention relates to patty forming method and apparatus of the type utilized in forming meat patties from a mass of meat. More particularly, this invention relates to a method and apparatus for forming individual meat patties from a mass of ground meat wherein the mass of meat is fed into a chamber, a piston is thrust into the chamber to force the meat through an aperture in the chamber into a patty form, the patty form is removed from the proximity of the meat chamber whereupon the patty is removed from the patty form and allowed to drop onto the top sheet of a stack of paper, the top sheet and its patty are transferred from the stack of paper to a stacking device, the sheet of paper and its patty are then transferred from the stacking device to a conveyor, and after a predetermined number of meat patties are transferred to the conveyor in this manner the conveyor is actuated to move the stack of patties away from the stacking machine. The apparatus utilized in performing the method comprises a patty molding portion, a paper interleaver, a stacking machine and a conveyor.

BACKGROUND OF THE INVENTION

With the increasing popularity of ground beef or "hamburger" meat and other such ground or pulverized foods, attempts have been made to mechanize the forming of patties. Hand forming of patties is a slow and tedious process and the size, shape and density of hand formed patties is usually inconsistent. While some progress has been made in mechanizing the process of forming meat patties, the apparatus utilized to date has been somewhat unsuccessful because of the expense of the apparatus, the slow operation of the apparatus, the constant attention required to operate the apparatus and the amount of meat or other substance wasted in operating the apparatus. Furthermore, the formation of the patty from the mass of ground meat has characteristically been an operation independent from the functions of placing a piece of paper between each patty and stacking the patties upon one another. Of course, these latter mentioned functions require the constant attention of an operator so that the expense of forming patties is quite high.

OBJECTS

Accordingly, the object of this invention is to provide a method of forming patties of meat and other pliable substances wherein individual patties are formed from a large mass of meat, the patties stacked upon one another with paper disposed between each patty without contacting the meat with human hands.

Another object of this invention is to provide a method of forming individual meat patties wherein each patty is accurately size and shaped and formed in a predetermined consistency.

Another object of this invention is to provide a method of forming meat patties where a minimum of meat is wasted in the process.

Another object of this invention is to provide apparatus for forming meat patties wherein the apparatus automatically forms meat patties, inserts paper between each meat patty, stacks the meat patties one upon another, and conveys the stacks of meat patties to a remote point for packaging.

Another object of this invention is to provide apparatus for forming and stacking meat patties wherein the apparatus is inexpensive to manufacture, operate and maintain, minimizes the waste of meat in its operation, requires a minimum of attention in operation, is sanitary in operation, easily cleaned and otherwise well designed to meet the economics of industrial manufacture.

Other objects, features and advantages of the present invention will become apparent upon reading the following disclosure, taken in conjunction with the accompanying drawing, in which:

DESCRIPTION

Figure 1:
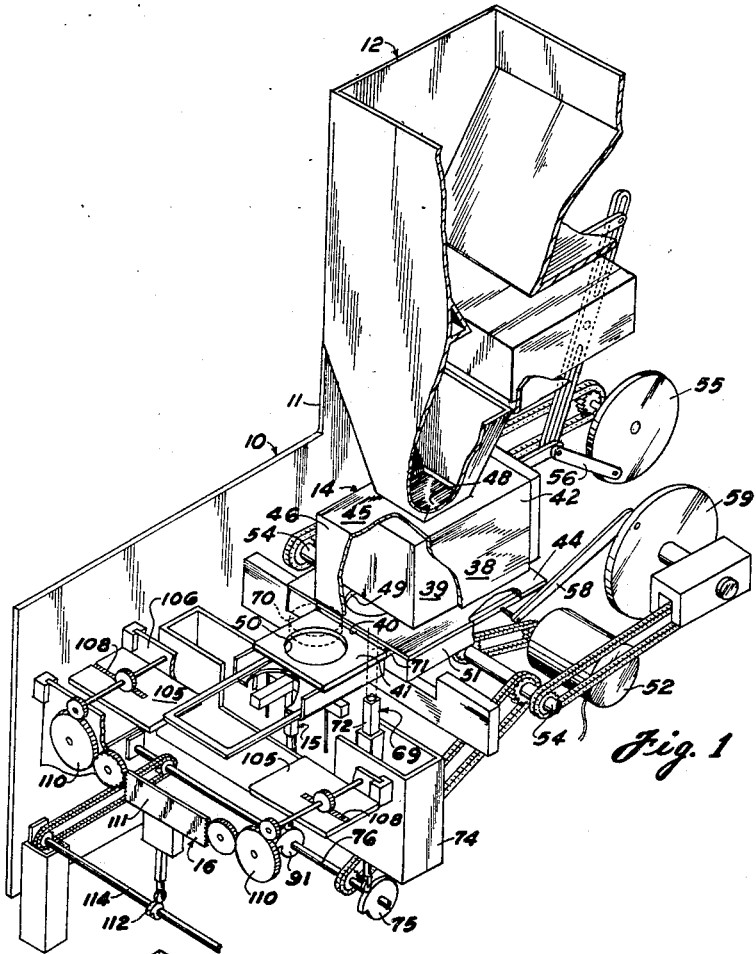
FIG. 1 is a schematic perspective view, with parts broken away, of the patty forming apparatus.
Figure 2:
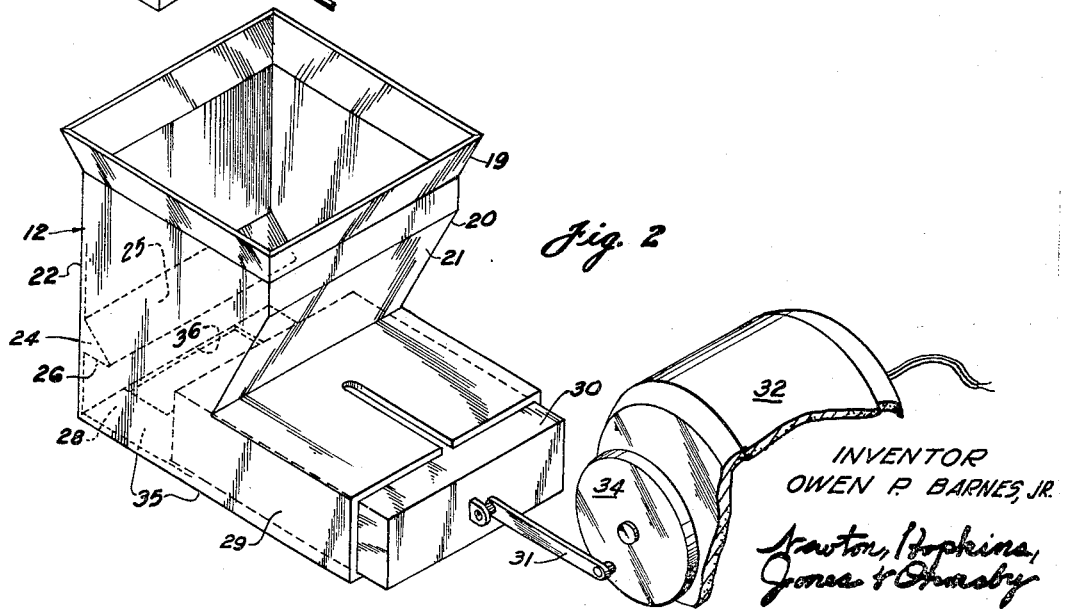
FIG. 2 is a perspective view of the feed hopper of the patty forming apparatus.
Figure 4:
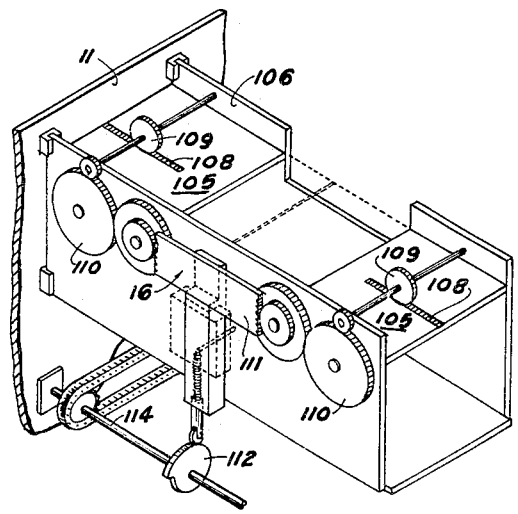
FIG. 4 is a perspective schematic view of the stacker of the patty forming apparatus.
Figure 5:
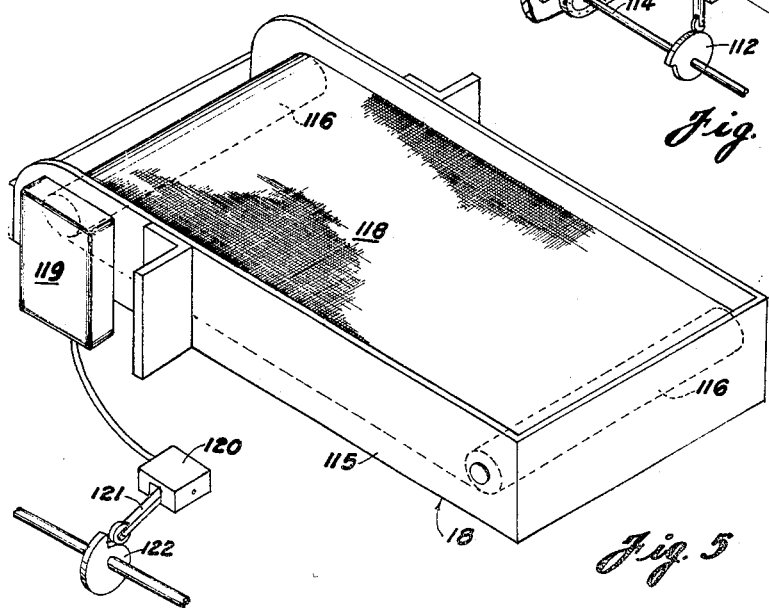
FIG. 5 is a perspective, schematic view of the conveyor of the patty forming apparatus.

Referring now more particularly to the drawing, in which like numerals indicate like parts throughout the several views, FIG. 1 shows a patty forming apparatus 10 which includes a housing 11 which supports the various portions of the apparatus. The patty forming apparatus 10 includes a self feeding hopper 12 (FIG. 2), patty molding apparatus 14 (FIG. 1), paper extruding mechanism 15 (FIG. 3), patty stacker 16 (FIG. 4), and conveyor 18 (FIG. 5). While the particular support structure which supports the various elements of the machine is not shown in the drawing for simplicity sake, it should be understood that the various elements of the machine are supported by the housing 11 which is supported from the floor or ground surface by legs or other appropriate support means.

The self feeding hopper 12 is mounted on the rear of the housing 11 and projects upwardly thereof. The self feeding hopper 12 includes an upper hopper portion 19 formed substantially in the shape of an inverted truncated pyramid and a lower hopper portion 20 connected to the bottom of the upper hopper portion 19. The lower hopper lower portion 20 has its rear wall 21 converging inwardly of the hopper area while its front wall 22 supports a compression flange 24 that extends inwardly of the hopper area. The compression flange 24 extends the entire width of the lower hopper portion and includes a downwardly tapered upper wall 25 and a lower wall 26 that projects inwardly of the hopper area at a right angle with the front wall 22. A piston chamber 28 is located immediately below the lower hopper portion 20, below lower wall 26 of the compression flange 24. A piston guide 29 extends toward the rear portion of the patty forming apparatus 10 and piston 30 is reciprocally received in the piston guide 29. A piston crank shaft 31 is connected at one of its ends to the piston 30 and at the other of its ends to a drive means which includes an electric motor 32 and flywheel 34. The piston crank shaft 31 is connected to the flywheel 34 at an off-center position so that when the electric motor 32 is energized and the flywheel rotated the piston crank shaft will oscillate about flywheel 34 and cause piston 32 to reciprocate in piston guide 29. As the piston 30 reciprocates, it moves toward compression flange 24, toward the area located below the lower wall 26 of the compression flange 24.

The lower wall 35 of the piston guide 29 and piston chamber 28 defines a transfer aperture 36 which is located adjacent the front wall 22 of the lower hopper portion 20. As the piston 30 moves into the piston chamber 28, any material, such as ground meat, located in the piston chamber will be compressed to some extent as the piston travels toward the lower wall 26, and positively compressed as the piston 30 moves beneath the lower wall 26 of the compression flange 24. Of course, the material being compressed will be forced through the transfer aperture 36. As the piston 30 is withdrawn from the piston chamber 28, the ground meat located above the piston in the lower hopper portion 20 will tend to fall into the space vacated by the piston 30. When the piston 30 begins its next compression stroke, the material recently received in the space vacated by the piston in the piston chamber 28 will be thrust toward the front wall 22, beneath the lower wall 26 of the compression flange 24, and toward the transfer aperture 36.

The self feeding hopper 12 is positioned above the patty molding apparatus 14. The patty molding apparatus 14 (FIG. 1) comprises a meat chamber 38, a meat piston 39, spacer plate 40, and patty molding plate 41. Meat chamber 38 is rectangular in configuration and includes side walls 42, bottom wall 44, top wall 45, and end wall 46, thereby forming an open ended chamber into which the meat piston 39 can be reciprocally received. Of course, meat piston 39 is sized and shaped to be tightly received in meat chamber 38. Meat piston 39 and piston 30 of the self feeding hopper 12 are both formed of hard plastic or other material that offers little resistance to their chambers, which are made of metal.

Top wall 45 of meat chamber 38 defines an aperture 48 centrally thereof which is coextensive with the transfer aperture 36 of the self feeding hopper 12. Thus, any meat forced through transfer aperture 36 of the hopper 12 will fall into the meat chamber 38 of the patty molding apparatus 14. Bottom wall 44 defines aperture 49 which is located intermediate the side walls 42 of the meat chamber and closely disposed to the end wall 46 thereof. Spacer plate 40 is disposed immediately below bottom wall 44 and defines an aperture therein that is identical in size and shape to the aperture 49 of the meat chamber 38. Patty molding plate 41 is positioned below spacer plate 40 and defines a central aperture 50 which is sized and shaped to the dimension to which it is desired to have the individual meat patties sized and shaped. The patty molding plate 41 is reciprocally received in support 51 so that it can be positioned immediately below the meat chamber 38, with its aperture 50 below aperture 49 of the meat chamber, or positioned as shown in FIG. 1 where the aperture 50 has been removed from below the meat chamber 38.

Meat piston 39 of the patty molding apparatus 40 is driven by the electric motor 52 which is positioned in the lower part of the housing 11. Electric motor 52 rotates a drive shaft to which several sprockets are attached and from which several chain drives are connected. Drive shaft 54 is connected to meat piston drive wheel 55 by means of a sprocket and chain assembly, and meat piston drive wheel 55 is connected to a piston drive connecting assembly 56 which is, in turn, connected to the meat piston 39. Since the piston drive connecting assembly 56 is connected to the meat piston drive wheel 55 near its periphery, rotation of the drive wheel will cause meat piston 39 to reciprocate in meat chamber 38.

Patty molding plate 41 is connected, by means of connecting rod 58 to molding plate drive wheel 59, which is, in turn, connected to drive shaft 54. Rotation of molding plate drive wheel 59 causes reciprocation of patty molding plate 41. It should be noted that molding plate drive wheel 59 and meat piston drive wheel 55 are out of phase; that is, when the connecting rod 58 of the molding plate drive wheel 59 pulls patty molding plate 41 beneath meat chamber 38 so that the aperture 50 of patty molding plate 41 is disposed below aperture 49 of the meat chamber 38, meat piston drive wheel 55 and its piston drive connecting assembly 56 will have reciprocated meat piston 39 into meat chamber 38. Of course, further rotation of drive wheels 55 and 59 causes meat piston 39 to be withdrawn from meat chamber 38 and patty molding plate 41 to be moved outwardly from beneath meat chamber 38.

Patty kickout assembly 69 is disposed adjacent the path of travel of the patty molding plate 41 and comprises a kickout disc 70, connecting arm 71 and drive arm 72. Drive arm 72 is reciprocally supported by paper extruding mechanism housing 74, and is driven by cam 75. Cam 75 is rotated by cam shaft 76, which is driven through a sprocket and chain arrangement from drive shaft 54. As cam 75 is rotated, drive arm 72 is reciprocated; cam 75 being driven in timed relationship with patty molding plate 41 so that the kickout disc 70 of the patty kickout assembly 69 will move in a downward direction only when the aperture 50 of the patty molding plate 41 is disposed exactly below the kickout disc 70. With this arrangement, kickout disc 70 will be remove the meat patty from patty molding plate 41 and then will be moved out of the way by its cam 75 so that patty molding plate 41 can be moved back beneath meat chamber 38 to receive more meat.

Paper extruding mechanism 15 is disposed below patty kickout disc 70. Paper extruding mechanism 15 includes a paper tray 80 which is mounted on support platform 81. Support platform 81 includes a downwardly extending piston housing 82 which is centrally apertured along its length. A connecting rod 84 extends across the central aperture of piston housing 82 and is received in the slot 85 of piston 86. Piston 86 is reciprocally received in the slide block 88, and the slide block 88 is rigidly connected to the housing 74 of the paper extruding mechanism 15. A flange 89 is connected to the lower end of piston 86 and spring 90 is disposed about the piston, between flange 89 and slide block 88, thereby urging piston 86 in a downward direction. Cam 91 is rotatably driven by cam shaft 92 which is connected, by means of a sprocket and chain arrangement, to drive shaft 54. Cam 91 is positioned to engage the lower portion of piston 86 so as to move the piston in an upward direction, against the bias of spring 90.

A pair of internally wound flat coil springs or negatory springs 94 are connected to the housing 74 of the paper extruding mechanism 15. Springs 94 are mounted on each side of piston 86 and their outer ends 95 are positioned in an upward direction and connected to the housing 74. Slide blocks 96 are also connected to housing 74, above springs 94, and extension arms 98 are slidably received through slide blocks 96. Extension arms 98 extend between the upper periphery of springs 94 and the bottom surface of support platform 81. With this construction, when cam 91 is rotated to move piston 86 in an upward direction, the slot 85 of piston 86 will ride over the connecting rod 84 of piston housing 82 so that piston housing 82, support platform 81 and paper tray 80 are free to move in an upward direction. The internally wound flat coil springs 94 will tend to expand and move extension arms 98 in an upward direction, thereby moving support platform 81 and paper tray in an upward direction. When cam 91 rotates further so that the land of cam 91 passes piston 86, the piston 86 will be urged in a downward direction by spring 90. Of course, downward movement of piston 86 causes its slot 85 to engage connecting rod 84 of the piston housing 82, thereby urging support platform 81 and paper tray 80 in a downward direction. As support platform 91 is urged in a downward direction, it forces extension arms 98 to move against the bias of their respective internally wound flat coil springs 94, thereby contracting the springs 94.

Figure 6:
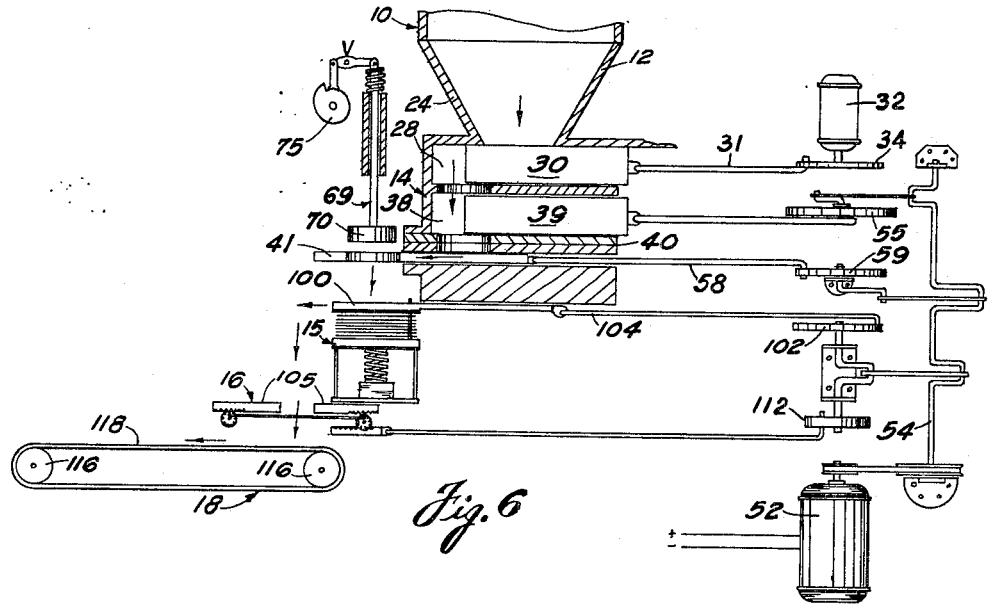
FIG. 6 is a schematic view of the patty forming apparatus.

A U-shaped paper extrusion tray 100 is constructed and arranged to reciprocate in a horizontal plane above paper tray 80. Paper extrusion tray 100 includes a rubber or other elastic, resilient pad 101 over its bottom surface, and is reciprocated in a horizontal plane by a drive wheel 102 and connecting rod 104 in a manner similar to that of the meat piston drive wheel 55 and molding plate drive wheel 59. The movement of the paper extrusion tray 100 is timed with the movement of the paper tray 80 and the movement of patty molding plate 41 so that the patty removed from the patty molding plate 41 by the kickout disc 70 will fall onto the paper stacked on paper tray 80, paper tray 80 will then be raised until it engages the underside of paper extrusion tray 100, and the paper extrusion tray 100 is then moved to the left (FIGS. 1, 3 and 6), thereby scraping the top sheet of paper from the stack of paper and moving it to the left, whereupon the sheet of paper and its patty are free to fall onto the patty stacker 16. The paper tray 80 includes an uwardly extending stanchion 83 located near its rear edge, and the paper stacked on the paper tray has a hole punched through it near one edge. The stack of paper is placed on the paper tray so that the stanchion extends through the hole in the paper and when the extrusion tray 100 sweeps across the top sheet of paper, the top sheet of paper will be torn from the stanchion 83 while the remaining sheets of paper will be held on the tray 80 by the stanchion 83. Stanchion 83 is sized so that when paper tray 80 is moved to its lower position, patty molding plate 41 can move over the the paper tray 80 without interfering with stanchion 83.

The rubber pad 101 attached to the bottom surface of paper extrusion tray 100 must be effective to impart static friction to the uppermost sheet of paper on the stack of paper, in spite of grease, waxy substances, or other foreign matter.

Patty stacker 16 (FIGS. 1, 4 and 6) is located adjacent the paper extrusion mechanism 15 and comprises a pair of reciprocating shelves or doors that alternately reciprocate toward and away from each other. Reciprocating doors 105 are supported by grooves formed in the inside surfaces of the patty stacker housing 106 and reciprocate toward and away from each in a horizontal plane. Movement of the reciprocating doors 105 in this manner is actuated by a rack 108 attached to the outside upper surface of each door 105 and pinions 109 arranged to rotatably mesh with the racks 108. Pinions 109 are motivated by gear trains 110 which are moved by the reciprocating rack 111. Rack 111 is reciprocated by cam 112 which is rotated by cam shaft 114, which derives its rotational movement through a sprocket and chain drive from cam shaft 76 of the patty kickout assembly, which derived its rotational movement from the drive shaft 54. Thus, cam 112 of the patty stacker 16 will be rotated in timed relationship with paper extruding mechanism 15, patty kickout assembly 69, and patty molding apparatus 14. When reciprocating rack 111 is moved in an upward direction by cam 112, gear train 110 will rotate pinions 109 to move reciprocating doors 105 toward each other, to their closed position. When the cam 112 moves further to allow reciprocating rack 111 to drop, doors 105 will move away from each other, to their open position. The timing of the elements of the patty stacker 16 is such that the reciprocating doors 105 will be in their closed position when the paper extrusion tray 100 of the paper extruding mechanism 15 moves the top sheet of paper from the stack of paper and its meat patty toward the patty stacker 16. The meat patty, with the sheet of paper attached to its bottom surface, will fall onto the closed doors 105, whereupon further movement of the drive shaft 54 of the patty forming 10 will cause the doors 105 to open, whereupon the patty will be dropped onto the belt of the conveyor 18.

Conveyor 18 (FIGS. 5 and 6) includes a housing 115 which supports a pair of rollers 116 disposed at opposite ends thereof and endless conveyor belt 118 surrounding the rollers. An electric motor 119 is operatively connected to one of the rollers 116, as by sprocket and chain assembly or direct drive, and a switch 120 is arranged to energize motor 119 at predetermined intervals. Switch 120 includes a lever arm 121 that acts as a cam follower and engages cam 122. Cam 122 is rotated in timed relationship with the remaining elements of the patty forming apparatus 10, as by sprocket and chain or direct drive arrangement, so that motor 119 will be energized at predetermined intervals to operate conveyor 18. It may be desired to have the remaining elements of patty forming apparatus 10 operate through several cycles before energizing conveyor 18 so that several meat patties may be stacked on the conveyor belt 18 before indexing the conveyor. To accomplish this function, the drive linkage between cam 122 and its driving element must be esablished at a particular ratio so that cam 122 will be rotated only a single time for a predetermined number of cycles of the remaining elements of the patty forming apparatus 10. For instance, it may be desirable to stack six patties in a single stack on the conveyor belt 18 before indexing the conveyor. Accordingly, a six to one ratio would be established between cam 122 and its driving element. Cam 122 is shaped so that switch 120 will be closed for a period of time sufficient for the electric motor 119 to index the conveyor to move the conveyor belt that distance sufficient only to move a stack of patties beneath the stacker 16 out from under the stacker. Thus, a maximum number of stacks of patties can be placed on the conveyor belt 118.

Housing 115 of the conveyor 18 is placed inside the patty stacker housing 106 in such a manner that the housing 115 and conveyor belt 118 at one end thereof extend below the opening formed by doors 105 of patty stacker 16, when in their open position, and at the other end thereof extend outwardly from the side of the housing 11 of the patty forming apparatus 10. With this arrangement, the patties will be dropped onto conveyor belt 18 inside housing 11, and when the conveyor 18 is indexed, the stacks of patties will be moved outwardly of the housing 11, where they can be retrieved by an operator and packaged for shipment.

Figure 3:
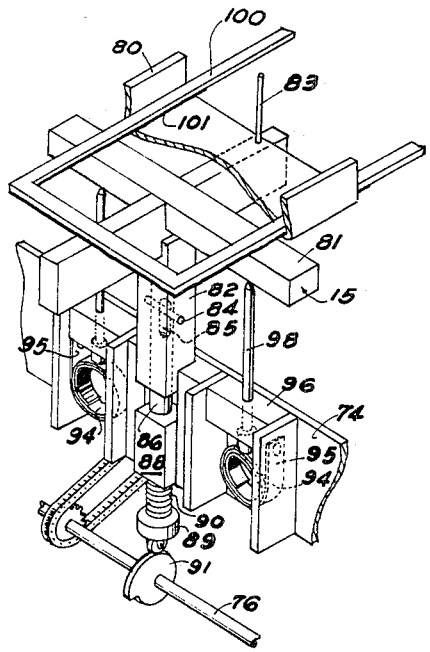
FIG. 3 is a perspective view, with parts broken away, of the paper interleaver of the patty forming apparatus.

It should be understood that while the paper extruding mechanism 15 has been shown as driven by cam 91 actuating the piston 86, the support plateform 81 can be driven by a flywheel having a connecting arm connected thereto, with a slot formed in the connecting arm to create lost motion between the flywheel and the support platform. Of course, the flywheel would be effective to move the support platform in a downward direction while the internally wound flat coil springs 94 would still be effective to move the support platform in an upward direction. Also, a conventional solenoid can be connected to the support platform 81 to effect its downward movement, in place of a cam arrangement as shown in FIG. 3 or the alternative flywheel and slotted connecting arm arrangement above described.

Figure 7:
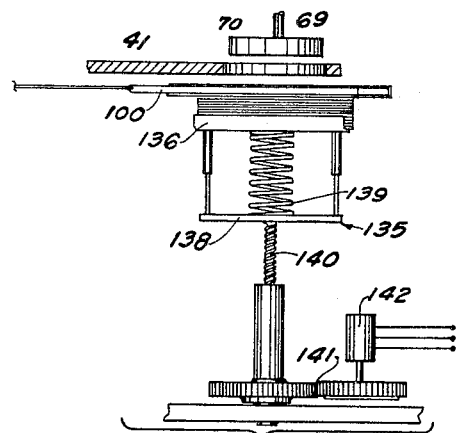
FIG. 7 is a schematic view of a modified form of the paper interleaver of the patty forming apparatus.
Figure 8:
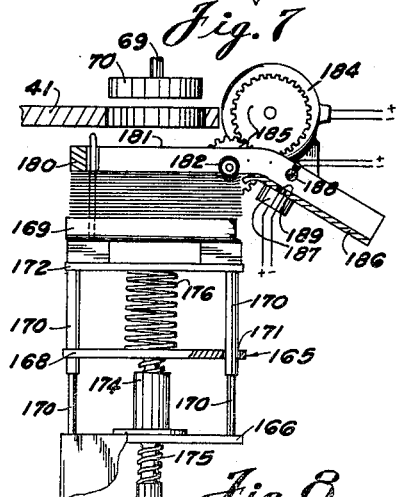
FIG. 8 is a schematic perspective view of another paper interleaver of the patty forming apparatus.

While paper extruding mechanism 15 has been shown in correlation with the patty forming apparatus, paper extruding mechanisms of FIGS. 7 and 8 may be used in place thereof. As is shown in FIG. 7, the paper extruding mechanism 135 comprises a paper tray 136, reciprocating platform 138, coil spring 139 mounted between platform 138 and tray 136, drive shaft 140, gear train 141, and slo-syn motor 142. Motor 142 oscillates gear train 141 to cause drive shaft 140 to reciprocate and reciprocate platform 138. Spring 139 causes tray 136 to be urged against the bottom surface of U-shaped paper extrusion tray 100. Of course, the movement of tray 136 is in timed relationship with the movement of the U-shaped extrusion tray 100 so that the tray 136 is moved against the extrusion tray 100 and maintained in this position while extrusion tray 100 is moved off the top of the stack of paper on the tray, thereby dragging the top sheet of paper off the stack of paper. When the U-shaped extrusion tray 100 completes this movement, the slo-cyn motor 142 is effective to lower tray 136 and allow the U-shaped extrusion tray 100 to return to its original position, above the stack of paper on the tray 136.

Figure 7A:
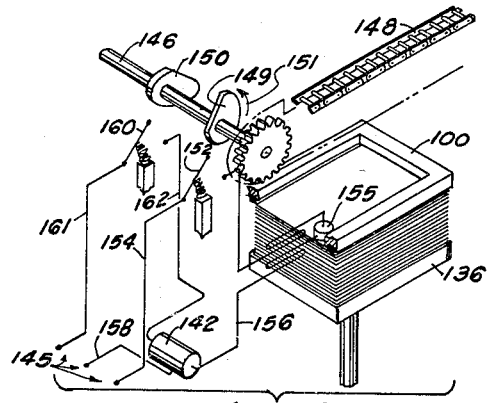
FIG. 7a is a schematic view of the electrical circuitry associated with the paper interleaver of FIG. 7.

FIG. 7a illustrates the electrical components effective to perform the function carried out by the slo-syn motor 142 of FIG. 7. Motor 142 is a reversible motor and is connected to a source 145 of electricity. A cam shaft 146 is connected to the drive shaft 54 by means of connecting chain 148, in a manner so that cams 149 and 150 are driven in timed relationship with main drive shaft 54. When cam 149 is rotated in the direction indicated by arrow 151, it contacts and closes switch 152. Switch 152 is connected by means of conductor 154 to the source 145 of electricity, and conducts this source through normally closed microswitch 155 to reversible motor 142 through electrical conductor 156. Of course, motor 142 is connected by means of electrical conductor 158 to the source 145. Thus, cam 149 is effective to operate motor 142 in a direction which causes tray 136 of paper extruding mechanism 135 to move in an upward direction. When the top sheet of paper of the stack of paper on tray 136 engages the U-shaped extrusion tray 100, microswitch 155 is depressed by the top sheet of paper to its open position, thereby opening the circuit previously closed by cam 149 and its switch 152. Thus, the motor 142 and upward movement of tray 136 is stopped. As cam shaft 146 continues to rotate, cam 150 contacts and closes switch 160 which connects the source 145 to reversible motor 142 through electrical conductor 161 and 162. Thus, the motor 142 is caused to rotate in the opposite direction by closing switch 160. This, of course, causes tray 136 to move in a downward direction, moving the stack of paper on the tray away from the U-shaped extrusion tray 100.

Thus, it can be seen that the electrical circuitry of FIG. 7a causes the stack of paper located on paper tray 136 to move into positive contact with the U-shaped paper extrusion tray 100 during every cycle of the machine, regardless of the amount of paper on paper tray 136.

FIG. 8 shows another form of the paper extruding mechanism. Paper extruding mechanism 165 includes a stationary platform 166, a floating platform 168 and a paper tray 169. Coil springs positioned within spring guide tubes 170 extend upwardly from each corner of the stationary platform 166, through apertures 171 of floating tray 168, and support tray support platform 172. A rotatable, internally threaded female socket 174 is rotatably connected to stationary platform 166. An externally threaded shaft 175 is rigidly connected to floating platform 168, and depends downwardly therefrom, through the female socket 174. Coil spring 176 is rigidly connected to the upper surface of floating platform 168, and extends between floating platform 168 and paper tray support platform 172. With this construction, female socket 174 can be rotated to move the externally threaded shaft 175 upwardly therethrough, thereby lifting the floating platform 168, coil spring 176 and paper tray support platform 172. Of course, floating platform 168 is not connected to springs 170 so that the lifting of floating platform 168 causes that platform to move upwardly about springs 170.

Paper extruding frame 180 is disposed above paper tray 169 and is generally U-shaped in configuration. The legs 181 of paper extruding frame 180 have mounted thereon resilient rollers 182. Rollers 182 are rotatable about a horizontal axis and are diametrically opposite from each other. Rollers 182 are motivated by motor 184 and drive gears 185. When paper tray 169 is urged upwardly by the elements disposed therebelow, the paper disposed thereon is urged against rollers 182. When motor 184 is energized, rollers 182 are caused to rotate and drag the top sheet of paper off the stack of paper on paper tray 169. Paper slide 186 is disposed outwardly of rollers 182 and adapted to catch the paper dragged from the stack of paper by rollers 182. Paper slide 186 is angled in a downward direction so that when papers from the stack of paper are placed thereon, the paper continues to move down the paper slide 186, toward the conveyor. A photoelectric cell 187 is mounted below paper slide 186, and a light source 188 is mounted above paper slide 186. An aperture 189 is defined in paper slide 186 so that light source 188 shines through paper slide 186 to the photoelectric cell 187. With this arrangement, when paper or other opaque substance extends from beneath rollers 182 on paper slide 186, the beam of light emanating from light source 188 toward its photoelectric cell will be interrupted.

Figure 8A:
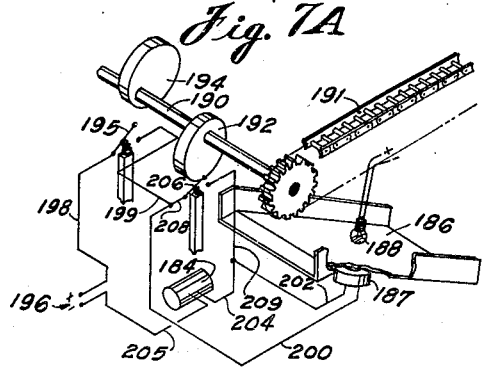
FIG. 8a is a schematic view of the electrical circuitry associated with the interleaver of FIG. 8.

Referring to FIG. 8a, the electrical elements associated with paper extruding mechanism 165 are shown. A cam shaft 190 is connected by means of sprocket and chain 191 to the main drive shaft 154 so that cams 192 and 194 are driven in timed relationship with the remaining elements of the patty forming apparatus. Cam 194 is effective to depress patty switch 195 which connects a source 196 of electricity through electrical conductors 198, 199 and 200 to photoelectric cell 187. The photoelectric cell 201 is connected by means of conductors 202 and 204 to motor 184, which is connected back to the source 196 by means of electrical conductor 205. If no opaque substance is present on paper slide 186, photoelectric cell 201 will cause its switch (not shown) to be closed and a circuit is made through motor 184, thereby causing rollers 182 to be rotated. When an opaque substance, such as colored paper, or a patty, moves down paper slide 186 and covers the aperture of the photoelectric cell 187, the switch of the photoelectric cell will be opened to break the circuit made to motor 184, thereby stopping the movement of rollers 182 and the movement of paper across the paper slide 186. As cam shaft 190 continues to rotate, switch 195 is opened. As cam shaft 190 rotates further, cam 192 closes switch 206 which connects switch 195 through conductors 208 and 209 to motor 184. Thus, when cam 194 again closes switch 195, switch 206 will remain closed for a short duration of time, as determined by the configuration of cam 192, so that a circuit is made to motor 184, thereby energizing rollers 182 again. Of course, further rotation of cam shaft 190 causes cam 192 to withdraw from switch 206, thereby opening switch 206. While this would ordinarily break the circuit to motor 184, the patty present on paper slide 186 will have been allowed to move across paper slide 186 so that the aperture on paper slide 186 will have been uncovered and the switch of photoelectric cell 187 will have closed again. Accordingly, the electricity flowing to motor 184 will continue until another patty is placed on slide 186 or cam 194 opens switch 195.

OPERATION

When it is desired to create individual patties from a mass of substance, such as meat patties from a mass of ground meat, the mass of meat is fed to the self feeding hopper 12 mounted at the rear and above the housing 11. Electric motor 32 of the hopper 12 is energized and electric motor 52 that drives the drive shaft 54 is also energized. Electric motor 32 is effective to reciprocate piston 30 in the piston chamber 28 of the hopper 12 so that the meat in the lower portion of the hopper will be compressed in the piston chamber 28 and urged through the transfer aperture 36, into meat chamber 38 of the patty molding apparatus 14. Drive shaft 54 causes reciprocation of meat piston 39 in meat chamber 38 so that the meat present in meat chamber 38 is compressed and forced through the aperture 49 in the bottom wall 44 of the meat chamber 38. It should be noted that piston 39 in its reciprocation does not completely close off communication between meat chamber 38 and hopper 12. This action insures that if the quantity of meat present in meat chamber 38 is too great to be accommodated by patty molding plate 41, the meat can be bypassed back into hopper 12.

When meat piston 39 is thrust into meat chamber 38, patty molding plate 41 is positioned below aperture 49 of the bottom wall 44 of the meat chamber 38, and a portion of the meat present in the meat chamber 38 will be forced by the piston 39 through the aperture 49 into the aperture 50 of the patty molding plate 41. Further movement of drive shaft 54 will cause meat piston 39 to be withdrawn from meat chamber 38 to receive more meat from hopper 12. Also, patty molding plate 41 is reciprocated so that it is moved out from under meat chamber 38, and disposed above paper extruding mechanism 15, whereupon patty kickout assembly 69, motivated by its cam 75, forces the patty present in the aperture 50 of the patty molding plate 41 downwardly by kicking out disc 70 being thrust through aperture 50 of the patty molding plate 41. Thus, the patty drops onto the upper sheet of the stack of paper present on paper extruding mechanism 15.

After the meat patty is placed on the top sheet of paper of the stack of paper present on the paper extruding mechanism 15, further rotation of drive shaft 54 causes cam 91 to lift piston 86 so that its slot 85 no longer holds support platform 81 and paper tray in their down position and the internally wound flat coil springs 94 are allowed to expand, thereupon pushing extension arms 98, support platform 81 and paper tray 80 in an upward direction until the top sheet of paper on the stack of paper engages the under surface of the paper extrusion tray 100. Further rotation of drive shaft 54 causes paper extrusion tray 100 to be moved to the left (FIGS. 1, 3 and 6), to remove the top sheet of paper and the patty resting thereon from the stack of paper, whereupon the patty and the sheet of paper attached thereto falls to the upper surface of the reciprocating doors 105 of the patty stacker 16. Further movement of drive shaft 54 causes cam 112 to allow the reciprocating rack 111 of patty stacker 16 to move in a downward direction, thereby opening the reciprocating doors 105 through the drive train 110. The patty and its sheet of paper then drop to the conveyor belt 118 of conveyor 18. After these elements have been cycled in this manner several times, cam 122 of conveyor 18 closes switch 120 to index conveyor 18, thereby moving the stack of patties placed on conveyor 118 from beneath the patty stacker 16, whereupon another stack of patties may be deposited. When conveyor 18 has been indexed several times, the stacks of patties will emerge from the side of the housing 11 and an operator may retrieve these stacks of patties for packaging and shipping or cooking.

While the various operating elements of the instant invention have been illustrated as being driven with various drive arrangements such as sprocket and chain arrangements, it should be understood that various other arrangements can be utilized without interfering with the function of the apparatus.

Since it may be desirable to form patties of different thicknesses from time to time, a patty molding plate of a different thickness can be substituted for patty molding plate 41. Of course, spacer plate 40 must also be replaced with another spacer plate that accommodates the difference in thickness of the patty molding plate 41. In other words, the space below meat chamber 38 is of a given dimension and if the patty molding plate 41 is varied in thickness, the spacer plate 40 must also vary so that the total thickness of the spacer plate and patty molding plate is equal to the space below the meat chamber 38.

At this point, it should be understood that the patty forming apparatus creates stacks of patties with paper disposed therebetween from a mass of meat, without handling the meat by hand after it is initially placed in the self feeding hopper 12. The operation of the machine is such that no meat will be wasted, and the timing of the various operating elements is such that the machine can be operated at a high rate of speed, to create as many as 800 individual meat patties per minute. The apparatus is simple in construction which facilitates its repair and cleaning in compliance with sanitation requirements. The patties formed by the apparatus are perfectly shaped, of a prescribed thickness, and of a consistent density. The operation of the paper extruding mechanism and stacker is such that the patties are not contacted by these or any other elements of the machine after being removed from the patty molding plate 41 by the kickout disc 70. Thus, the individual patties are gently handled so that their shape and size is not changed after the molding process. The patty stacker operates to gently drop the individual patties, paper first, so that even adjacent patties in a stack of patties do not contact each other because of the pieces of paper disposed therebetween.

It will be obvious to those skilled in the art that many variations may be made in the embodiments chosen for the purpose of illustrating the present invention without departing from the scope thereof as defined by the appended claims.

What is claimed as invention is:

1. Apparatus for forming individual patties from a mass of plastic material comprising
   a feed chamber,
   a compression chamber,
   a patty mold
   a hopper means for storing and feeding the mass of material toward the feed chamber,
   feed means in the feed chamber for feeding the mass of material through a feed chamber aperture into the compression chamber,
   compressing means in the compression chamber for compressing the mass of material and urging the mass of material into the patty mold,
   transfer means for transferring the patty formed in the patty mold to the top sheet of a stack of material,
   material engaging means for engaging the material about a portion of its periphery and transferring it and the patty resting thereon from the stack of material onto a horizontal surface, and
   means for stacking a plurality of sheets of material and their patties from the horizontal surface into a single stack,
   wherein the hopper means comprises a hopper including an upper portion shaped substantially as an inverted truncated pyramid and a lower portion including at least one converging wall, and a compression flange extending across the width of at least one side of the lower portion of said hopper to define the upper portion of said feed chamber.

2. Apparatus as described in claim 1 wherein said compression flange includes a sloped upper surface and a horizontal lower surface.

3. Apparatus for forming individual patties from a mass of plastic material and stacking the formed patties with separator sheets of paper therebetween comprising:
   a feed chamber;
   a compression chamber in communication with said feed chamber and defining a discharge opening therefrom;
   a patty mold member reciprocally mounted in juxtaposition with the discharge opening in said compression chamber and defining a molding aperture therein selectively positionable in registration with the discharge opening in said compression chamber as said mold member is reciprocated;

hopper means for storing and feeding the mass of material into said feed chamber;

feed means in said feed chamber for feeding the mass of material from said feed chamber into said compression chamber;

compression means in said compression chamber for compressing the mass of material and urging the mass of material through said discharge opening and into said molding aperture when said molding aperture is in registration with said discharge opening;

ejection means for ejecting the mass of material in said molding aperture from said aperture when said aperture is out of registration with said discharge opening;

a paper tray reciprocally mounted beneath said ejection means and said mold member and adapted to carry a plurality of separator sheets of paper thereon in a stacked relationship;

each of the sheets of paper defining a hole therethrough adjacent one edge thereof;

a support pin mounted on said paper tray and arranged to pass through the hole in each sheet of paper in the stack on said tray to maintain the sheets of paper in the stack;

a U-shaped paper extending member reciprocally mounted between said mold member and said tray for selectively removing sheets of paper from the stack carried by said tray and including a resilient bottom surface selectively engageable with the uppermost sheet of paper in the stack;

said paper tray moving said uppermost sheet of paper in the stack into and out of engagement with said bottom surface of said U-shaped extruding member and positioning the uppermost sheet of paper so that said bottom surface engages same adjacent a major portion of the periphery of the uppermost sheet of paper on that side opposite said support pin to move the upermost sheet of paper from the stack while tearing the sheet from said pin;

a transfer means positioned adjacent the stack of paper for receiving each sheet of paper moved from the stack by said extruding member and including a pair of reciprocating doors selectively movable apart to drop the sheet of paper therefrom; and, drive means for operating said feeding mechanism, said compression mechanism, and said mold member to position said molding aperture in registration with said discharge opening and forcing said mass of material therein to form a patty, for moving said molding aperture out of registration with said discharge opening and causing said ejection means to remove said patty in said aperture onto the uppermost sheet of paper in said stack, for moving said uppermost sheet of paper in the stack with the patty thereon into engagement with said bottom surface of said U-shaped extruding member, for moving said extruding member to remove the uppermost sheet of paper with the patty thereon from the stack onto doors in a closed position, and for reciprocating said doors to drop the sheet of paper with the patty thereon therefrom to form a stack of patties with the sheets of paper therebetween.

References Cited
UNITED STATES PATENTS

| | | | |
|---|---|---|---|
| 2,553,823 | 5/1951 | Holly | 17—32 X |
| 2,757,411 | 8/1956 | Condon | 17—32 |
| 2,803,458 | 8/1957 | Holly | 17—32 X |
| 2,813,798 | 11/1957 | Toby | 17—45 X |
| 2,981,973 | 5/1961 | Elmore | 17—45 |
| 3,126,683 | 3/1964 | Richards et al. | |
| 3,137,029 | 6/1964 | DeZolt | 17—32 |
| 3,203,037 | 8/1965 | Anhanger et al. | 17—32 |
| 3,312,997 | 4/1967 | Merrels | 17—32 |
| 3,319,286 | 5/1967 | Ammons et al. | 17—45 |
| 3,354,846 | 11/1967 | Ferrary et al. | 17—32 |

LUCIE H. LAUDENSLAGER, Primary Examiner